US006283304B1

(12) United States Patent
Gottlieb et al.

(10) Patent No.: US 6,283,304 B1
(45) Date of Patent: Sep. 4, 2001

(54) METHOD FOR SORTING MAILPIECES

(75) Inventors: Robert K. Gottlieb, Milford; Joseph D. Mallozzi, Trumbull; Cindy Mangiameli, Southbury, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/396,835

(22) Filed: Sep. 15, 1999

(51) Int. Cl.[7] ................................ B07C 5/12; G06F 7/00

(52) U.S. Cl. ....................... 209/603; 209/900; 270/58.09; 700/223

(58) Field of Search ............................. 270/58.09, 58.11, 270/58.14; 209/603, 900; 700/219, 220, 223, 224, 226, 227

(56) References Cited

U.S. PATENT DOCUMENTS

| | | | |
|---|---|---|---|
| 4,244,672 | 1/1981 | Lund | 414/134 |
| 4,488,610 | 12/1984 | Yankloski | 177/4 |
| 5,238,123 | 8/1993 | Tovini et al. | 209/556 |
| 5,421,464 | 6/1995 | Gillmann et al. | 209/584 |
| 5,464,201 * | 11/1995 | Deen et al. | 270/58.09 |
| 5,599,009 | 2/1997 | Mandel et al. | 270/58.09 |
| 5,603,492 | 2/1997 | Mandel et al. | 270/58.09 |
| 5,609,333 * | 3/1997 | Mandel et al. | 270/58.09 |
| 5,718,321 | 2/1998 | Brugger et al. | 198/359 |
| 5,833,076 | 11/1998 | Harres et al. | 211/51 |
| 5,850,901 | 12/1998 | Schuster et al. | 198/370.05 |
| 5,857,830 | 1/1999 | Harres et al. | 414/798.9 |
| 5,893,464 | 4/1999 | Kiani et al. | 209/584 |
| 6,151,534 * | 11/2000 | Smith et al. | 209/534 X |

* cited by examiner

*Primary Examiner*—Tuan N. Nguyen
(74) *Attorney, Agent, or Firm*—Albert A. Vitale; Michael E. Melton

(57) ABSTRACT

This invention overcomes the disadvantages of the prior art by providing a method of sorting mailpieces which requires less stopping of the sorting process for bin emptying. The present invention is directed to a mailpiece sorting method which indicates when a bin is partially full to the level of a partially full sensor so that an operator can empty that bin. Additionally, a bin-full calculation is performed for determining if redirection of the mailpieces to an alternate bin is necessary should the operator not empty the bin as directed. If a bin is partially full to the level of the sensor, the process performs an addition of thicknesses of all of the mailpieces which are in the mailpiece delivery system, but not yet delivered to the bin to determine whether those mailpieces would fill the bin. If the bin would be full, it is determined whether an alternate bin is available and, if so, the mailpieces are routed to the alternate bin. If an alternate bin is not available, the sorting system is shut down and the full bin(s) is(are) emptied.

14 Claims, 2 Drawing Sheets

METHOD FOR SORTING MAILPIECES

FIELD OF THE INVENTION

The invention disclosed herein relates generally to a method for sorting mailpieces using a mail sorting apparatus and, more particularly, to a method for efficiently using mail sorting apparatus by anticipating full bins and redirecting mailpieces to decrease the amount of time that the mail sorting apparatus is not sorting.

BACKGROUND OF THE INVENTION

Mailpiece sorting can be performed manually or with automated equipment designed specifically to perform the sorting task. Manual sorting is labor intensive and time consuming and has historically been done using pigeon hole type sorting stations. Typical modern mailpiece sorting equipment incorporates a feeding mechanism for feeding mailpieces, a separating mechanism for separating the mailpieces from each other, a reading means for reading the information on the mailpieces, a mailpiece transport mechanism for transporting the mailpieces to compartments or bins, compartments or bins for receiving the mailpieces, and software for making choices regarding placement of mailpieces into the compartments and a control device.

The operation of automated sorting equipment typically entails an operator placing an armload of mail that has been edge aligned onto the feeder portion of the apparatus. The mailpieces are fed into the sorting apparatus and sorted into bins or compartments. Typically, when one or more bins become full, the sorting apparatus stops, and the bins are manually emptied into a mail tray by an operator. The foregoing increases the amount of time that is required to sort the mail. Some apparatus have complex automated mechanisms for emptying bins. From the mail tray, the mailpieces are either sent to a delivery location or sorted again. After the full bin(s) have been emptied, if additional mailpiece sorting is needed, the sorting apparatus is restarted and sorting continues.

The stopping of the sorting apparatus for full bins is typically performed with the assistance of bin-full sensors. The typical mail sorting apparatus has two sensors in each bin. The first sensor senses when the bin is almost full. The amount in the bin when it is almost full is the minimum amount that is acceptable for storage in a postal service mail tray. The second sensor senses when the bin is full. The amount in the bin is the maximum amount that can be stored in a postal service mail tray.

Another type of sorting apparatus disclosed by the prior art utilizes a cartridge, inserted into the bin, for collecting the mail. The cartridge is removed from the sorting apparatus by use of a robotic apparatus which transfers the cartridge to a docking station. This system requires stopping of the sorting apparatus each time a bin is full.

All of the above mentioned sorting systems require stopping of the sorting apparatus to clear the bins. Stopping the sorting apparatus decreases the efficiency of the sorting machine since the machine is not operating when it is being emptied. Other sorting systems deal with full bins differently as explained below.

Sorting apparatus that have two arrays of bins are also used. The mailpieces are first sorted into a first array of bins and, while those bins are being swept or emptied, the mailpieces are resorted into a second array of bins. Thus, the down time of the sorting machine is reduced by having a second path that can process mailpieces while the first path is shut down. The second sorting path makes the system complex, less compact and adds to the cost of the system.

Still, other sorting apparatus use a first set of bins which are configured to eject mail into a second set of bins which convey below the first set of bins. In this arrangement, when a bin is full, the mailpieces can be ejected without stopping the sorting apparatus. However, this arrangement is mechanically complex and requires many moving parts and coordination of the second set of bins, called conveying bins, with the ejection of the mail from the first set of bins.

Thus, one of the problems of the prior art is that some systems shut down frequently for full bins to be emptied. An additional problem of the prior art is that some systems require two bin sensors per bin to sense the fullness of the bin. Another problem of the prior art is that the sorting time is not maximized. Another problem of the prior art is that multiple bin sets are required for some systems. Yet another problem of the prior art is that some of the sorting bins require an ejection shoot, and the multiple bin sets require timing between bins for catching ejected mail. Yet another problem of the prior art is that some of the sorting bins require additional apparatus such as a cartridge in the bin for capturing and removing the mailpieces.

SUMMARY OF THE INVENTION

This invention overcomes the disadvantages of the prior art by providing a method of sorting mailpieces which reduces the amount of time the sorting process is stopped to empty bins. This in turn affords quicker mailpiece processing. The present invention is directed to, in a general aspect, a mailpiece sorting process which is performed using a mailpiece sorting apparatus. The sorting system reads information on the mailpiece and compares it to information in a database in order to determine the appropriate bin for mailpiece delivery. The fullness of the bins is calculated, and when one or more bins are almost full, and alternate bins are available, the mailpieces are transferred to alternate bin(s).

The mailpiece sorting apparatus may generally comprise a feeder, a scanner, a mailpiece deliverer, compartments or bins for receiving sorted mailpieces, sensors mounted in the bins and a control system. Mailpieces are fed into a sorting apparatus and measured for thickness. Appropriate thickness sensors are mounted in the apparatus along the path of the mailpiece. The thickness is stored in a memory device such as RAM (random access memory). The mailpieces are read, and delivery of the mailpieces is designated to an appropriate bin. The mailpiece thickness of the delivered mailpiece is removed from the RAM. A sensor in each bin senses whether the bin in which the mailpiece was delivered is partially full to the level of the sensor. When a bin is partially full, the system indicates that the operator should empty that bin. Additionally, a bin-full calculation is performed for determining if redirection of the mailpieces to an alternate bin is necessary should the operator not empty the bin as directed in a specified amount of time. If a bin is partially full to the level of the sensor, the process performs an addition of thicknesses of the mailpieces which are in the mailpiece delivery system and assigned to a particular bin, but not yet delivered to the bin, to get a calculated thickness and determine whether the calculated thickness would fill the bin. If the bin would be full, the system determined whether an alternate bin is available. If an alternate bin is available, then mailpieces are routed to an alternate bin. If an alternate bin is not available, the sorting system is shut down and the full bin or bins, as the case may be, are emptied. If there then are more mailpieces to be processed, the method is restarted. If there are no more mailpieces to be processed, the method ends. The method provides for sorting of mailpieces using fewer sensing devices per bin and with less stopping of the sorting apparatus to empty the bin(s).

Thus, an advantage of the method of the present invention is that it requires less stopping of the sorting system in order to empty bin(s). Another additional advantage of the present invention is that less bins sensors are needed to detect fullness of the bins. Another advantage of the present invention is that it allows for more sorting time. Another advantage of the present invention is that it does not require complex mechanism in the bins for removing or ejecting mail. Other advantages of the invention will in part be obvious and will in part be apparent from the specification. The aforementioned advantages are illustrative of the advantages of the various embodiments of the present invention.

DETAILED DESCRIPTION IF THE PRESENT INVENTION

In describing the present invention, reference will be made herein to FIGS. 1–2 of the drawings in which like numerals refer to like features of the present invention.

Figure 1:
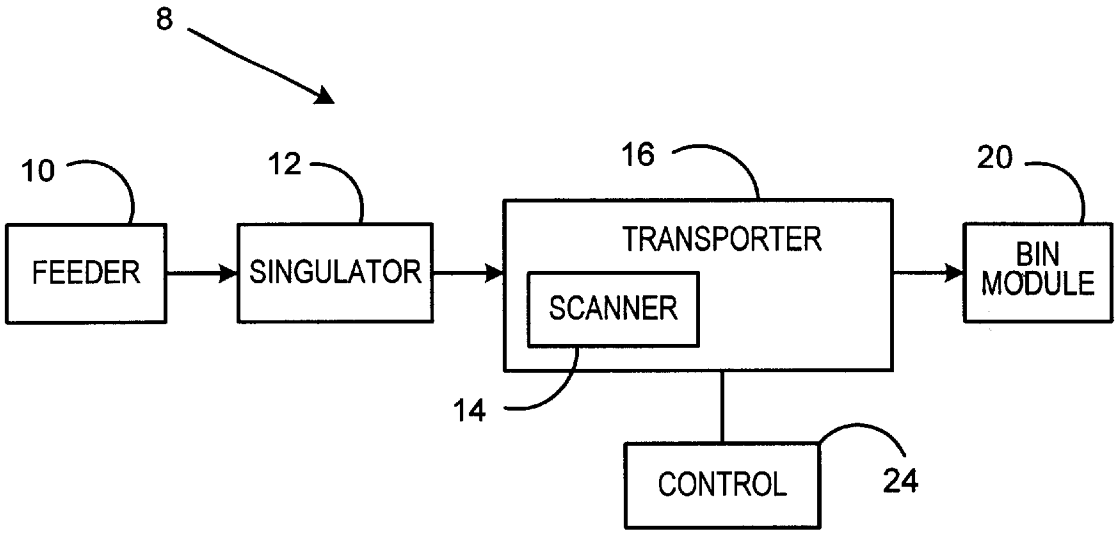
FIG. 1 is a block diagram of an embodiment of a mailpiece sorting apparatus with which a method of the present invention may be performed.
Figure 1A:
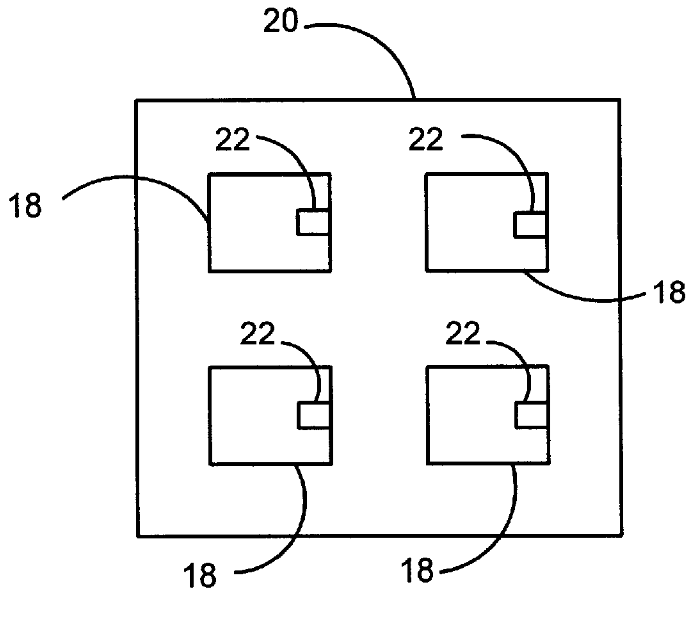
FIG. 1*a* is a block diagram illustrating a four bin module which may be part of the mailpiece sorting apparatus which is used to perform a method of the present invention.

FIG. 1 is a block diagram of an embodiment of a mailpiece sorting apparatus 8 with which the method of the present invention may be performed. The apparatus comprises a feeder 10, a singulating module 12, a scanner 14, a controller 24, a transport apparatus 16 for delivering the mailpieces to bins, and bin module 20. FIG. 1*a* is a block diagram illustrating a four bin module 20 which may be part of the mailpiece sorting apparatus 8. The four bin configuration and sensor configuration is shown for illustration purposes; other suitable configurations may be used. The sensor 22 in each bin 18 senses when the bin is partially full to a particular percentage (for example 60 percent) of the bin height. The sensor, for example, may be a photo electric sensor for detection of light, which when blocked indicates the bin is full to the height of the sensor. A light emitting diode on the outside of the bin may be used to signal the operator that the bin should be emptied. Preferably, the sensor senses when the bin is 60 percent full; however, other percentages may be used as determined by one of ordinary skill in the art. Sensing at 60 percent, in most instances, gives the operator sufficient time to react to the sensor and empty the bin before it becomes completely full. Sixty percent is also a sufficient amount such that the operator will not have to make frequent visits to the bin to empty the bin as would be needed if the sensor was positioned to sense when the bin, for example, was 40 percent full. The system may be controlled by a microprocessor controller 24 such as, for example, a personal computer with a Pentium II™ microprocessor. The microprocessor can run an operating system such as a QNIX operating system which provides real-time control of the components of the mailpiece sorting apparatus 8. The computer also includes appropriate memory devices for storage of information such as an address database, thickness measurements and thickness calculations. One of ordinary skill in the art would be familiar with the general components of the sorting apparatus upon which the method of the present invention may be performed.

Figure 2:
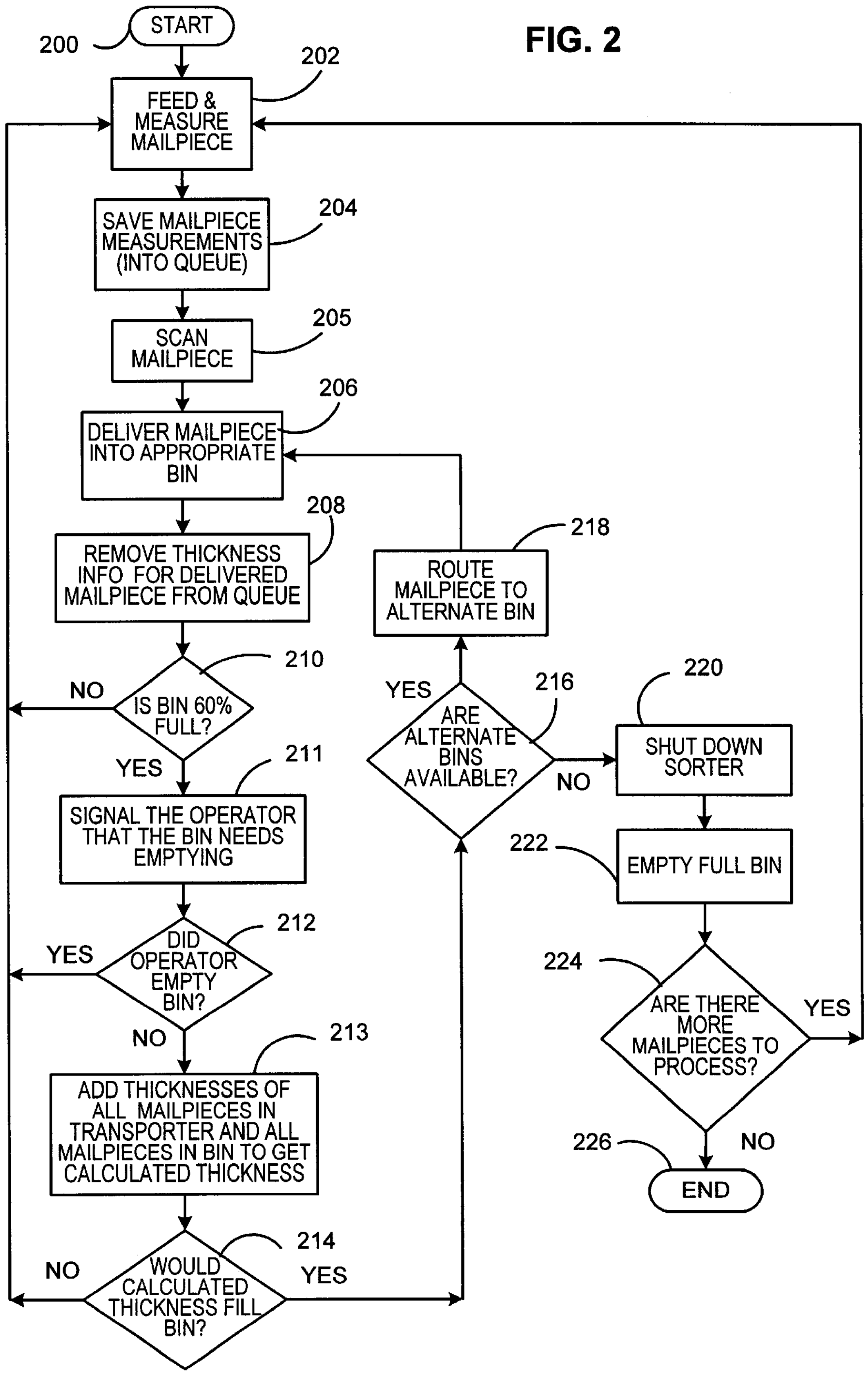
FIG. 2 is a flow chart of one embodiment of the method of the present invention, illustrating steps for sorting mailpieces and calculating bin-fullness.

FIG. 2 is a flow chart of one embodiment of the method of the present invention, illustrating steps for sorting mailpieces and calculating bin fullness. At step 200 the method begins. At step 202, the mailpiece is fed into the sorting apparatus by feeder 10 and measured by thickness sensors (not shown) in the apparatus. At step 204 the thickness measurement is saved in a queue or stack memory device (not shown) which stores measurements of mailpieces that are being transported. At step 205 the mailpiece is evaluated to determine the appropriate bin for the mailpiece. At step 206, the mailpiece is delivered into the appropriate bin. At step 205, the measurement is saved in a queue or stack memory device (not shown) which stores measurements of mailpieces for the particular bin in which the mailpiece was delivered. In step 208, the thickness information pertaining to the mailpiece is removed from the transporter stack memory device. Then at step 210, a query is made as to whether the bin in which the mailpiece was delivered is almost full. If the bin is almost full, a sensor indicates to the operator that the bin should be emptied. In the preferred embodiment, the almost full value is 60 percent of the bin height. At step 212 it is determined whether the bin was emptied. If the bin was emptied, the method returns to step 202. If the bin was not emptied the method continues at step 213.

Continuing at step 213, the thicknesses of all of the mailpieces which are to be delivered to a particular bin and which are being tracked by the embedded controller and stored in the transporter queue but not delivered are added to the bin almost full value to obtain a calculated thickness. Next, at step 214 a query is made as to whether the calculated thickness equals a bin-full thickness to determine if the bin is full. If the bin is not full at step 214, then feeding and measuring, storing thickness and calculating bin-full thicknesses as in steps 202 through 214 continue as described above. If the bin is full, at step 216 a query is made as to whether alternate bins are available for use in conjunction with the mail delivery designation of the full bin. If alternate bins are available, the mailpiece(s) for the full bin is routed to the alternate bin in step 218. The step 218, of routing a mailpiece to an alternate bin, can be performed in each iteration of the method until there are no alternate bins remaining. After the mailpiece is routed to the alternate bin at step 218, the mailpiece is delivered to the appropriate bin at step 206 and the method continues until no alternate bins are available. If no alternate bins are available at step 216, then the sorting apparatus is shut down at step 220. The full bin is emptied at step 222. At step 224 a query is made as to whether there are more mailpieces to process. If there are more mailpieces to process, the machine is restarted and the sorting method picks up where it left off. If there are no more mailpieces to process, the method ends at step 226.

After the performance of step 218, where the mailpiece is routed to an alternate bin, and at step 206, the mailpiece is delivered into the appropriate alternate bin. At step 208, the thickness of the mailpiece is removed from the transporter stack memory device. At step 210, a query is made as to whether the bin in which the mailpiece was delivered is almost full. In the preferred embodiment, the almost full value is 60 percent of the bin height as described above. At step 212 it is determined whether the bin was emptied. If the bin was emptied, the method returns to step 202. If the bin was not emptied the method continues at step 213. At step 213, the thicknesses all of the mailpieces which are to be delivered to a particular bin and which being tracked by the embedded controller and stored in the transporter queue but not delivered are added to the bin almost full value to get a calculated thickness. Next, at step 214 a query is made as to whether the bin is full. If the bin is full, at step 216 a query is made as to whether alternate bins are available for use in conjunction with the mail delivery designation of the full bin. If alternate bins are available, the mailpiece(s) for the full bin is routed to the alternate bin in step 218. The step 218, routing a mailpiece to an alternate bin, can be performed in each iteration of the method until there are no alternate bins remaining. If no alternate bins are available at step 216, then the sorting apparatus is shut down at step 220.

The full bin is emptied at step 222. At step 224 a query is made as to whether there are more mailpieces to process. If there are more mailpieces to process, the machine is restarted and the sorting method picks up where it left off. If there are no more mailpieces to process, the method ends at step 226.

It should be noted that there are alternate methods for calculating the fullness of the bin. For example, if the bin partially full sensor is positioned at 60 percent full, then the mailpieces in the transport can be added to determined whether they add up to a thickness equal to the remaining 40 percent of the bin. It should also be noted that the calculation may compensate for compression of the thickness of the mailpieces caused by the sorting apparatus. The percentage of compensation can be determined by analysis of mailpiece thickness prior to processing as compared to mailpiece thicknesses after processing to determine a statistical percentage of compression or settling.

The bin almost full sensor provides a way to signal to the operator that the bin should be emptied. If the bin is not emptied, the system provides an alternate method of rerouting mailpieces to an alternate bin. These methods provide for more efficient sorting of mailpieces. The present invention provides methods for overcoming the problems of the prior art and efficiently sorting incoming or outgoing mailpieces. While the present invention has been disclosed and described with reference to a single embodiment thereof, it will be apparent, as noted above that variations and modifications may be made therein. It is also noted that the present invention is not limited to mailpiece sorting. It is, thus, intended in the following claims to cover each variation and modification that falls within the true spirit and scope of the present invention.

What is claimed is:

1. A method of sorting mailpieces comprising the steps of:

a) delivering mailpieces to a plurality of bins;

b) determining that an individual bin from step (a) is partially full of mailpieces to a predetermined amount;

c) determining the individual thicknesses of the mailpieces assigned to the individual bin but not yet delivered to the predetermined partially full bin;

d) adding the individual thicknesses of the mailpieces assigned to the individual bin but not yet delivered to the predetermined partially full bin amount to obtain a calculated fullness amount;

e) continuing delivering the mailpieces to the bin if the calculated fullness amount is less than a predetermined bin-full amount; and f) delivering the mailpieces to an alternate bin if the calculated fullness amount is greater than the predetermined bin-full amount.

2. The method as claimed in claim 1 wherein in step (d) an arithmetic calculation is performed to compensate for reduction in thicknesses of the mailpieces caused by processing.

3. The method as claimed in claim 1 wherein the predetermined partially full amount is about 60 percent of the bin height.

4. The method as claimed in claim 1 wherein the predetermined bin-full amount is about 100 percent of the bin height.

5. A method of sorting mailpieces comprising the steps of:

a) delivering mailpieces to a plurality of bins;

b) determining that an individual bin is partially full of mailpieces to a predetermined bin amount;

c) determining the remaining capacity of the bin;

d) determining the individual thicknesses of the mailpieces assigned to the individual bin but not yet delivered to the predetermined partially full bin;

e) calculating the total thickness of the individual mailpieces assigned to the bin but not yet delivered to determine if the thickness is equal to the remaining capacity of the bin;

f) continuing delivering the mailpieces to the bin if the calculated value is less than a remaining capacity of the bin; and g) delivering the mailpieces to an alternate bin if the calculated value if greater than the remaining capacity of the bin.

6. The method as claimed in claim 5 further comprising the step of calculating to compensate for reduction in thicknesses of the mailpieces caused by processing.

7. The method as claimed in claim 5 wherein the predetermined amount for partially full bin is about 60 percent of the bin height.

8. The method as claimed in claim 5 wherein the remaining capacity of the bin is about 40 percent of the bin height.

9. A method of sorting mailpieces comprising the steps of:

a) measuring the thickness of a first mailpiece to be sorted;

b) storing the thickness of the first mailpiece in a first memory device;

c) delivering the first mailpiece into a bin;

d) storing the thickness of the first mailpiece in a second memory device;

e) removing the thickness of the first mailpiece from the first memory device;

f) sensing whether the bin is partially full;

g) measuring the thickness of a second mailpiece to be sorted;

h) determining that the second mailpiece should be delivered to the bin;

i) storing the thickness of the second mailpiece in the first memory device;

j) adding the thickness of the second mailpiece to a partially full bin value to obtain a calculated bin-full value when it is sensed that the bin is partially full; and k) determining whether the calculated bin-full value would fill the bin.

10. The method as claimed in claim 9 further comprising the steps of:

l) routing the second mailpiece to an alternate bin if in step (k) it is determined that the bin would not be full if the second mailpiece were delivered to the bin.

11. The method as claimed in claim 9 further comprising the steps of:

l) routing the second mailpiece to the bin if in step (k) it is determined that the bin would not be full if the second mailpiece were delivered to the bin.

12. The method as claimed in claim 9 wherein in step (j) an arithmetic calculation is performed to compensate for reduction in thicknesses of the mailpieces caused by processing.

13. The method as claimed in claim 9 wherein the partially full bin value is about 60 percent of the bin height.

14. The method claimed in claim 9 wherein the bin-full value is about 100 percent of the bin height.

* * * * *